United States Patent [19]
Coutandin et al.

[11] Patent Number: 5,030,321
[45] Date of Patent: Jul. 9, 1991

[54] METHOD OF PRODUCING A PLANAR OPTICAL COUPLER

[75] Inventors: Jochen Coutandin, Langenlonsheim; Werner Groh, Lich; Peter Herbrechtsmeier, Königstein am Taunus; Jürgen Theis, Frankfurt am Main, all of Fed. Rep. of Germany

[73] Assignee: Hoechst Aktiengesellschaft, Frankfurt am Main, Fed. Rep. of Germany

[21] Appl. No.: 535,826

[22] Filed: Jun. 11, 1990

[30] Foreign Application Priority Data

Jun. 13, 1989 [DE] Fed. Rep. of Germany ....... 3919262

[51] Int. Cl.$^5$ .......................... B44C 1/22; B79C 37/00
[52] U.S. Cl. ..................................... 156/643; 156/633; 156/654; 156/668; 219/121.64; 350/96.21; 350/96.15
[58] Field of Search ............... 156/633, 643, 654, 668; 219/121.68, 121.69, 121.73, 121.84, 121.85; 350/96.15, 96.2, 96.21, 96.22

[56] References Cited

U.S. PATENT DOCUMENTS 4,824,522 4/1989 Baker et al. ..................... 156/668 X
4,880,494 11/1989 Kaukeinen et al. ................ 156/633

OTHER PUBLICATIONS

Srinivasan et al., "Self-Developing Photoetching of Poly(Ethylene Terephthalate) Films by Far-Ultraviolet Excimer Laser Radiation", Appl. Phys. Lett. 41(6), Sep. 15, 1982, pp. 576-578.
Boiarski, "Low-Cost 1×2 Fiber Optic Coupler Using Plastic Fiber", SPIE, vol. 840, Fiber Optic Systems for Mobile Platforms (1987), pp. 29-36.

*Primary Examiner*—William A. Powell
*Attorney, Agent, or Firm*—Curtis, Morris & Safford

[57] ABSTRACT

Channels in which polymeric optical waveguides can be laid can be milled in surfaces of plastic sheets by means of an excimer laser. The free space between the optical waveguides is filled up with a transparent casting resin.

The channels produced by means of the laser are distinguished by high dimensional accuracy and low surface roughness.

5 Claims, 5 Drawing Sheets

METHOD OF PRODUCING A PLANAR OPTICAL COUPLER

The invention relates to a method of producing a planar optical coupler for polymeric optical waveguide systems using an excimer laser.

An optical coupler is an optical component which distributes the optical power in N input fibers over M output fibers. Such components are used in passive optical waveguide networks as optical power distributors or optical power combiners. The division of the optical power or the combination of the optical power of a plurality of fibers into one fiber is carried out in the mixing region of the coupler.

A distinction is made between fiber optical and planar optical couplers. Essentially two methods have hitherto been known for producing planar optical couplers for polymeric optical waveguide systems.

A method for producing planar optical components for polymeric optical waveguides in which a 250 μm thick photoresist layer is deposited on a substrate on top of a multiple coating, which photoresist layer is structured by means of a mask and UV light (cf. A. Boiarski, SPIE, vol. 840, page 29 (1987)) is known. After development, the unexposed regions yield a waveguide channel which is square in cross section and in which polymeric optical waveguides having a diameter of 250 μm are laid. The free space between the fibers is then filled up with a suitable optical casting resin.

An optical coupler is furthermore known which is produced in a manner such that the grooves made in a transparent substrate are filled with an optically transparent material for the purpose of forming waveguide channels, the refractive index of said material being higher than that of the substrate (cf. JP 61-73,109). The technical realization of the waveguide channels is not described.

Finally, it is also known to process plastics with an excimer laser (cf. R. Srinivasan et al., Appl. Phys. Letters, 41 (b) page 576 (1982)).

It has now been found that waveguide channels having low surface roughness and high dimensional accuracy can be milled in a plastic with an excimer laser.

For the method according to the invention, a sheet made of a transparent plastic is mounted on a sliding table capable of moving in the x or y direction in order to provide channels. The sheet is irradiated with a focusing excimer laser beam extending in the z direction. The sliding table is moved in a manner such that the channels for the desired waveguide structure are milled into the transparent sheet. Another possibility is to illuminate the plastic sheet through a metal mask having the desired structure. In that case, two methods may be used: firstly a considerably expanded laser beam which illuminates the entire mask, or secondly, a slit-type laser beam which covers the mask in width but advances over the length of the mask with the aid of a moveable mirror.

The plastic sheet is composed of a transparent material such as, for example, PMMA, PS, polymethylpentene, PET or PC. The thickness of the sheet is 1 to 20 mm, preferably 1 to 10 mm. Depending on the type of coupler to be produced, the length and width of the sheet are in the range of from 5 to 200 mm, preferably 80 to 120 mm. For the purpose of ablation, preferably ArF (laser wavelength $\lambda = 193$ nm) is used as excimer laser gas filling for PMMA and polymethylpentene, and preferably KrF (wavelength $\lambda = 248$ nm) for PC, PET and PS.

After waveguide channels have now been milled in the transparent plastic sheet using an excimer laser, polymeric optical waveguides can be laid in the channels and the free space between the fiber ends can be filled up with a transparent casting resin.

It is more economical to coat the structured plastic sheet with a metal by electrodeposition and to use the metal structure produced as a mold insert for an injection molding tool for the purpose of mass production.

The advantages of the method according to the invention compared with the known methods are, on the one hand, the higher dimensional accuracy and the lesser degree of wall roughness of the channels obtained, on the other hand, the possibility of producing structure heights of 1 mm and over, which is not readily possible with the known methods.

FIG. 1 is an exploded perspective view of a preferred embodiment of a symmetric Y-coupler formed in accordance with the present invention specifically illustrating a PMMA-sheet with milled out channels (1), (2) and (3) forming the Y-profile (lower half), and the polymeric optical waveguides (5, 6, 7) (upper half).

FIG. 2 an exploded perspective view of a symmetric Y-coupler, similar to FIG. 1, showing an additional PMMA-sheet (13), which is cemented onto the coupler as a cover.

The example below explains the invention with reference to FIGS. 1, 2, 3, 4 and 5.

Production of a Y coupler

Figure 1:
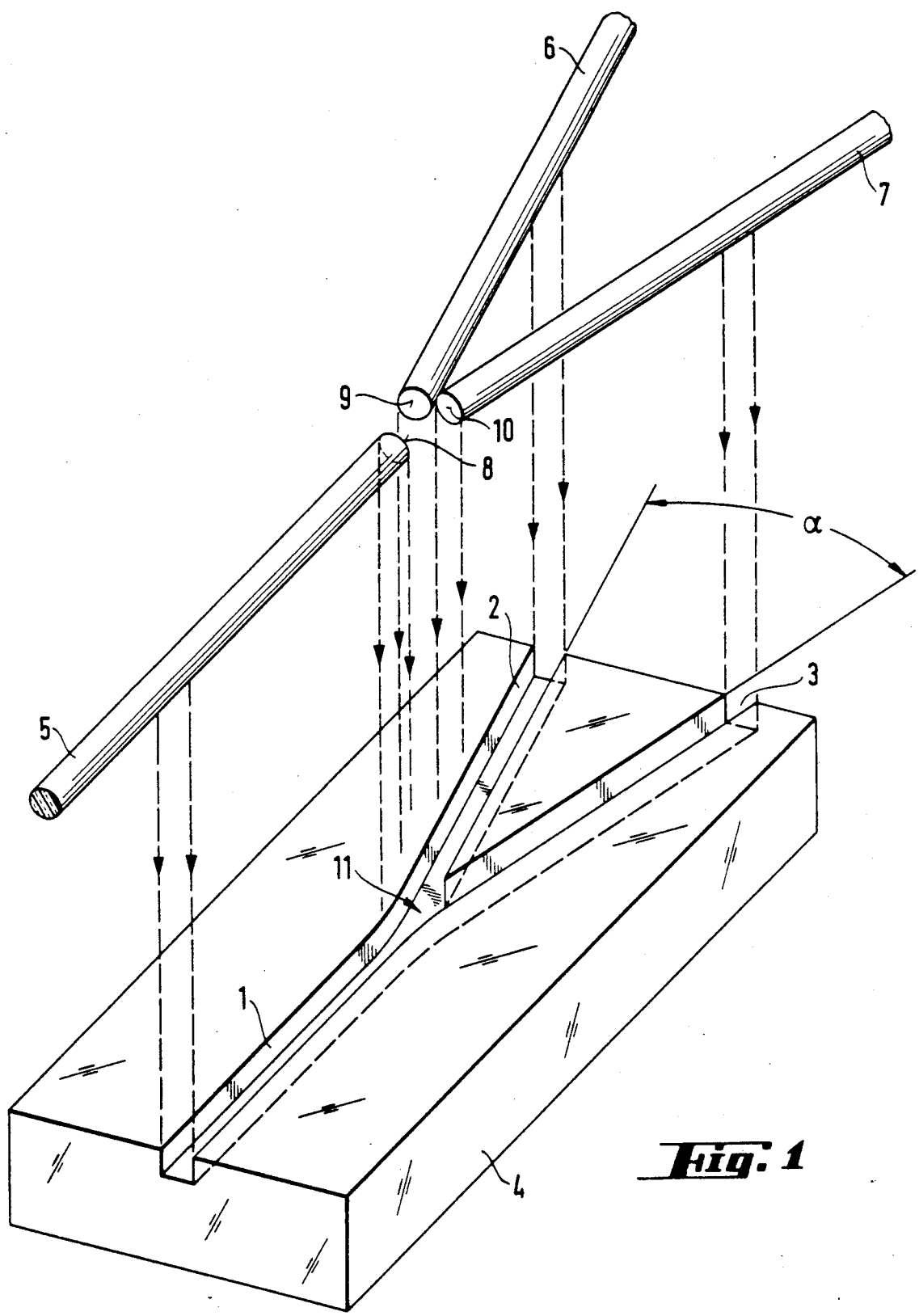

A 4 mm thick PMMA sheet (4) having a length of 30 mm and a width of 20 mm was mounted on a sliding table capable of moving in the x and y direction. The table was controlled by a computer in which the coordinates of the y-shaped waveguide channels had been stored. The beam of an excimer laser employing ArF ($\lambda = 193$ nm) which was focused on the small sheet perpendicularly to the plane of the table milled the channels (1), (2) and (3) forming the y profile in accordance with the specified coordinates in the plastic. The width and depth of the channels was precisely 1 mm and the angle α of the y was 20° (FIG. 1).

Figure 2:
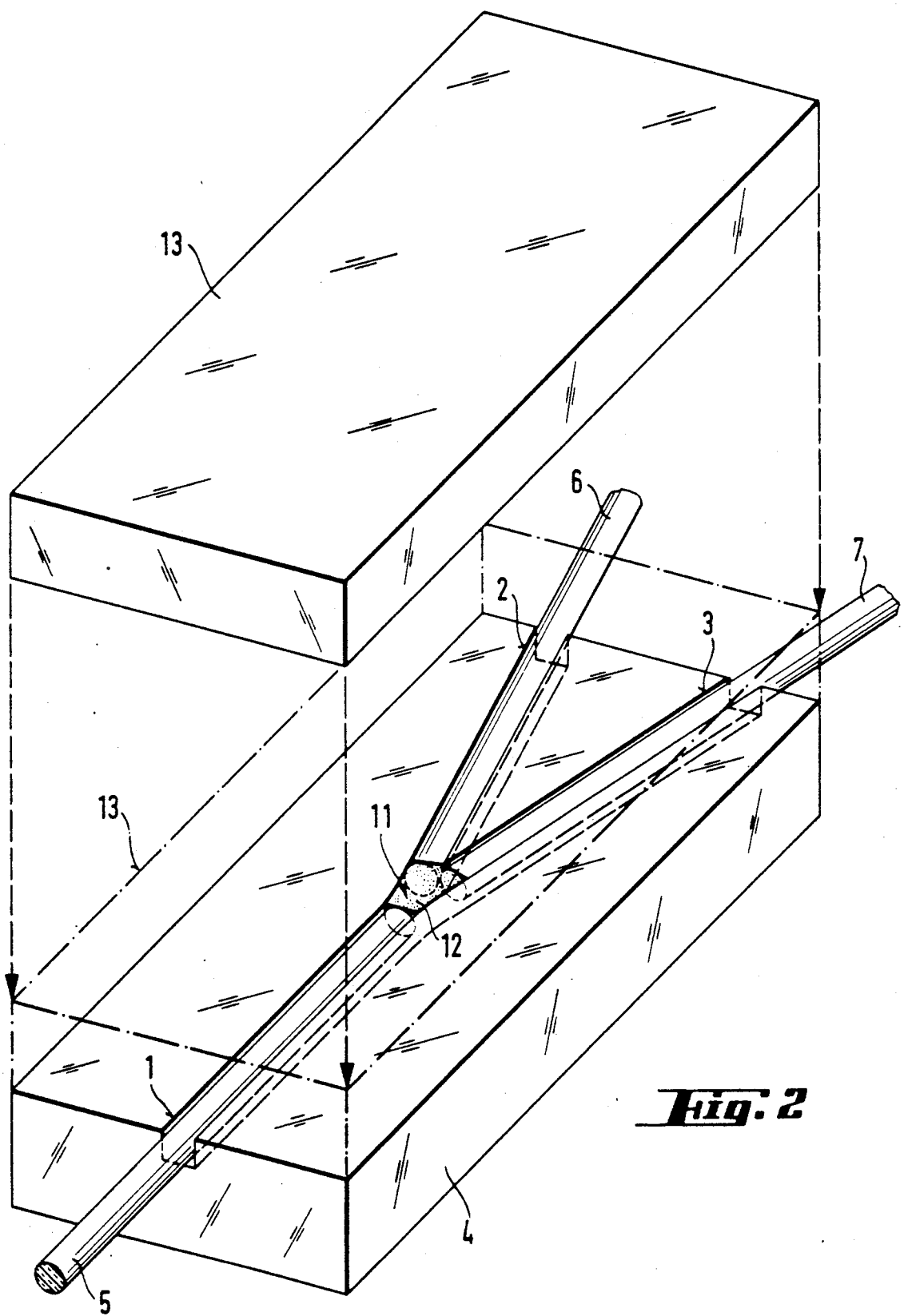

After cleaning this milled part, polymeric optical waveguides (5,6,7) having a diameter of 1 mm, whose ends (8,9,10) had previously been prepared with a microtome knife in view of the good optical quality required, were laid in the channels (1), (2) and (3) relatively close to the coupling point (11) (FIG. 2).

The free space between the end faces (8,9,10) of the fibers was filled with an optically transparent epoxy resin (12) (EPO-TEK 301-2, $n_D = 1.564$). The refractive index of the resin (12) was chosen so that the numerical aperture (NA) of the coupling region (11) with PMMA as optical cladding was equivalent to the NA of the polymeric optical waveguides (5,6,7) laid in the grooves (1,2,3).

Finally, a small PMMA sheet (13) was cemented onto the coupler as a cover.

The insertion loss with the fiber (5) situated in channel (1) as input and the fibers situated in the channels (2) and (3) as outputs was 4.7 db and 4.9 db respectively. The difference between them was therefore only 0.2 db.

Figure 3:
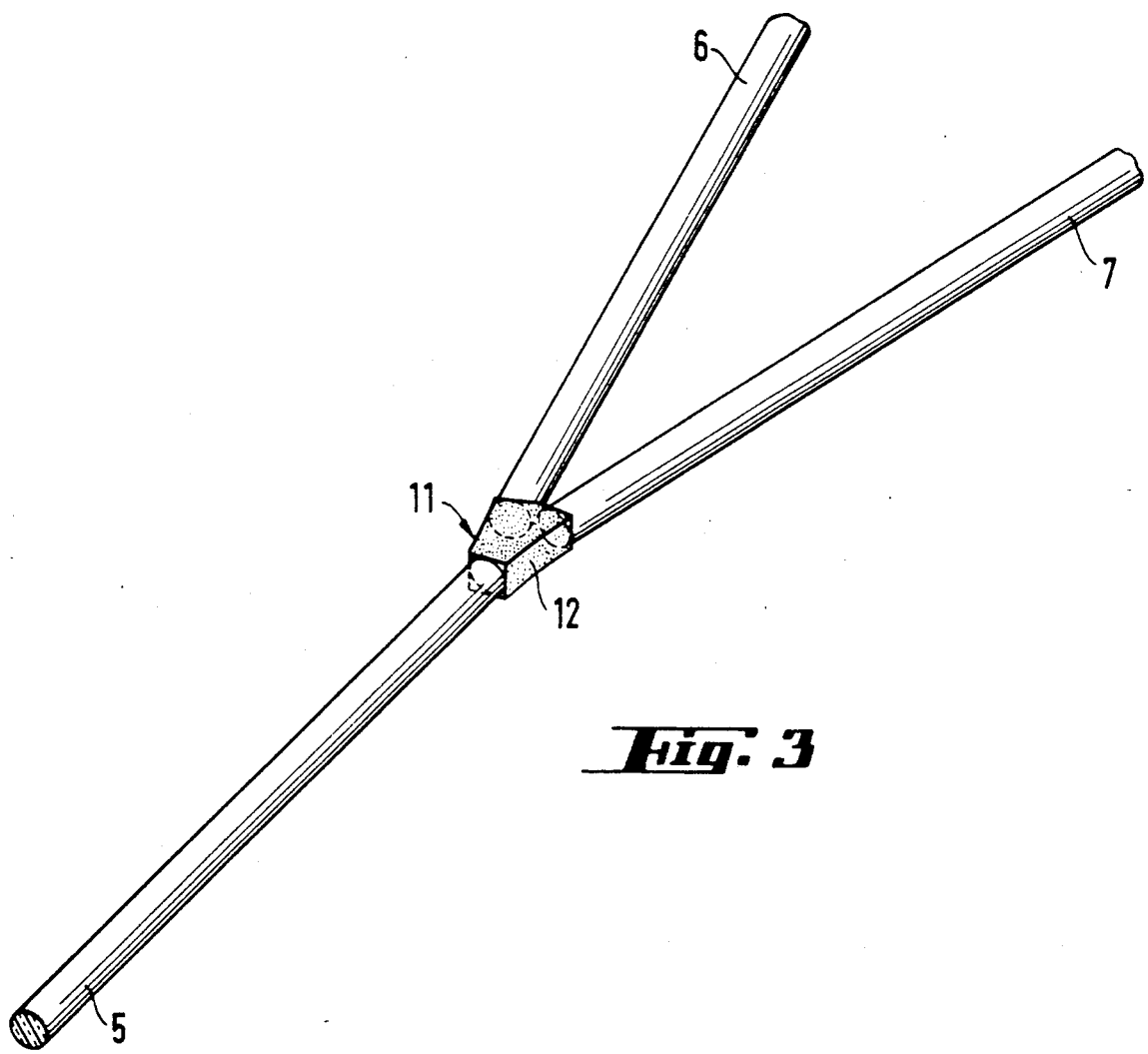
FIG. 3 is a perspective view of a preferred embodiment of a Y-coupler formed by three optical waveguides (5, 6, 7) which are joined at a coupling point (11) by an epoxy resin.

FIG. 3 shows a Y coupler which is formed by three optical waveguides (5, 6 and 7) which were joined at the coupling point (11) in the manner described above. It is, for example, also possible to produce this coupler in an injection molding tool.

Production of an asymmetric coupler

An asymmetric Y channel profile was milled in a 4 mm thick PMMA sheet (4) having a length of 35 mm and a width of 30 mm with the aid of an excimer laser. The channels produced (1, 2, 3) had a width and depth of 1 mm. The angle $\beta$ of the asymmetric Y was in the region of 0° to 60°, typically between 5° and 25°.

Figure 4:
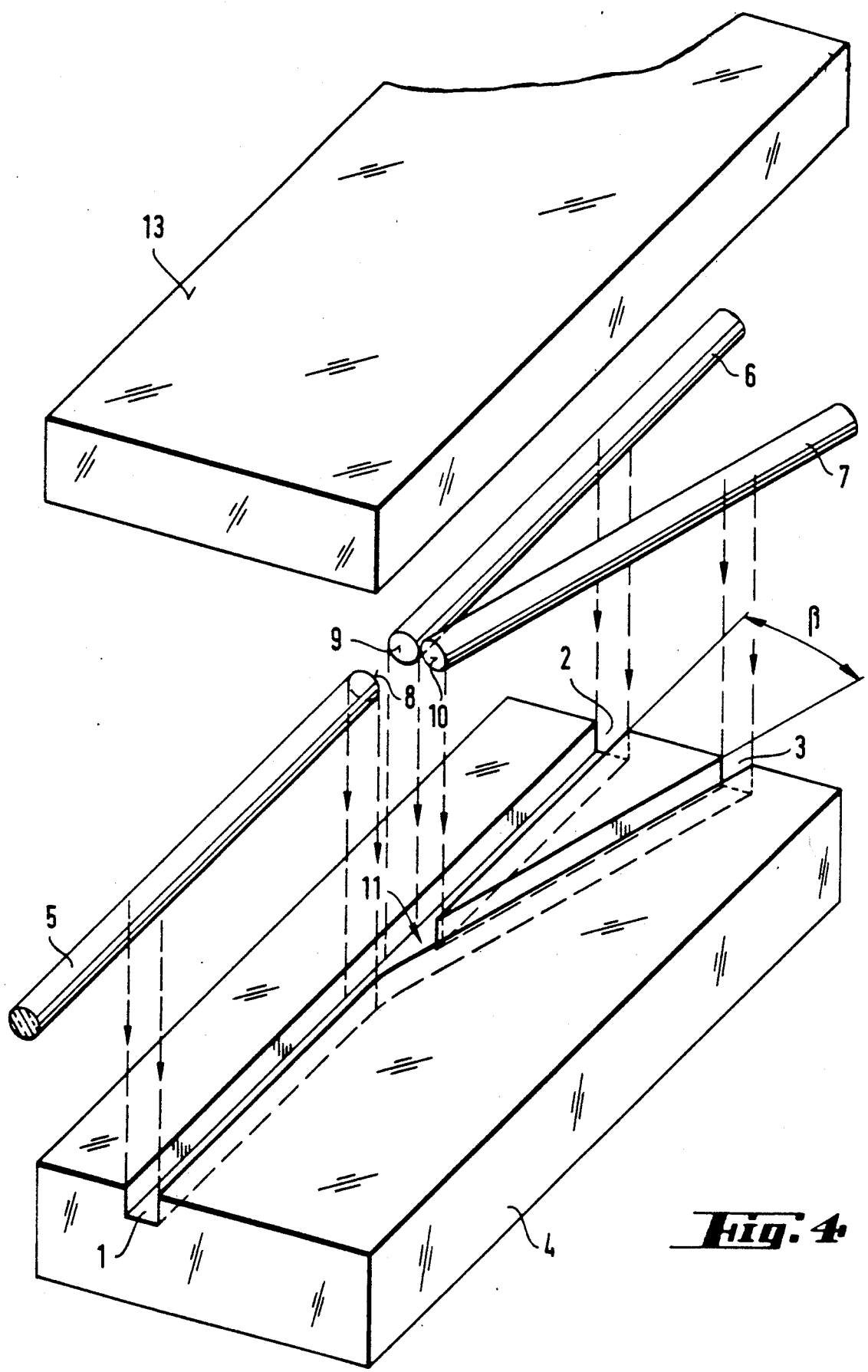
FIG. 4 is an exploded perspective view of another preferred embodiment of an asymmetric Y-coupler made in accordance with the present invention.

After cleaning a milled part, polymeric optical waveguides having a diameter of 1 mm whose ends had been cut with a microtome knife were laid in the channel relatively close to the coupling point (11) (FIG. 4). Analogously to the symmetrical Y coupler, the residual free space was filled up with an optically transparen resin (EPO-TEK 301-2, no=1.564). A thin small PMMA sheet (13) which was cemented to the coupler sheet (4) was again used as cover. The small sheet had a length of 35 mm, a width of 30 mm and a thickness of 2 mm.

In this way it is possible to establish a defined dividing ratio by varying the angle $\beta$.

Y coupler with fiber profile

A symmetrical Y structure having a semicircular profile was milled out in two thick small PMMA (4, 13) sheets having a length of 30 mm, a width of 20 mm and a thickness of 4 mm using an excimer laser ($\lambda = 193$ nm). The channels produced (1', 2', 3') had a radius of 1 mm.

Figure 5:
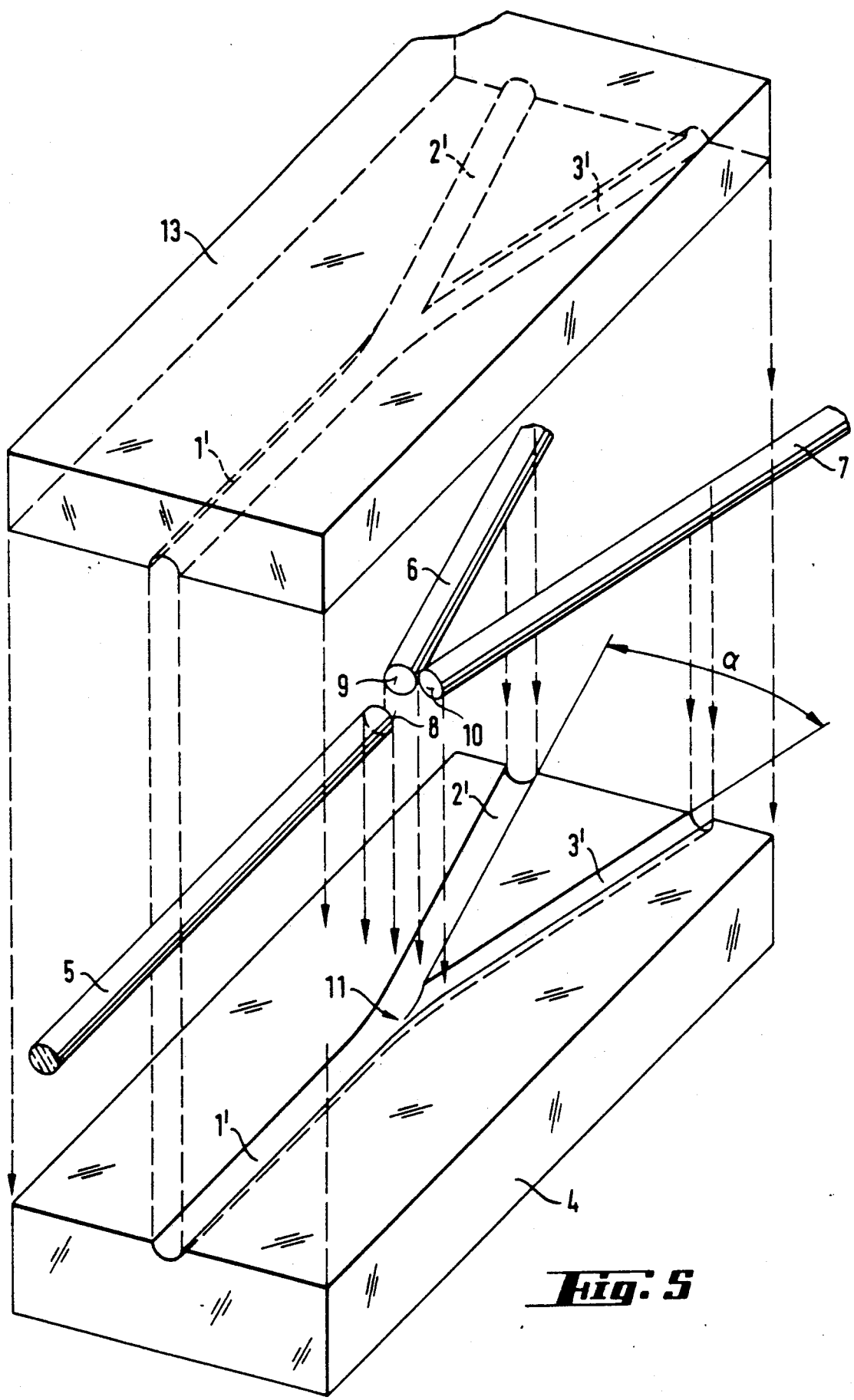
FIG. 5 is an exploded perspective view of an asymmetric Y-coupler specifically illustrating a second PMMA-sheet (13) which also contains channels (1', 2' and 3') forming a Y-profile.

After cleaning the milled part, polymeric optical waveguides having a diameter of 1 mm whose ends had been cut with a microtome knife were laid in the channels of a block relatively close to the coupling point (11) (FIG. 5). Analogously to the preceding examples, the gap was again filled up with an epoxy resin. To avoid bubble formation, the adhesive between the fibers was predried in air. After curing had set in, the second small PPMA sheet (13), which also contained a Y profile, was inverted over the first small sheet (4) in which the fibers (5, 6, 7) had been laid, and cemented.

The insertion loss with the fiber situated in the channel (1) as input and the fibers situated in the channels (2) and (3) as outputs was 4.0 db and 4.2 db respectively. The difference between them was therefore only 0.2 db. It was possible to reduce the face loss of 1 db present in the preceding Examples to a minimum as a result of the semicircular channel profile. The insertion loss could also be reduced in the case of the asymmetric Y coupler by up to 1 db by means of a semicircular edge profile.

There is also the possibility of milling semicircular profiles with a CNC ("computer numerical-control") machine.

We claim:

1. A method of producing a planar optical coupler by providing channels in the surface of a transparent plastic sheet, laying polymeric optical waveguides in the channels and filling up the free space between the optical waveguides with a transparent casting resin, comprising milling out the channels by means of an excimer laser.

2. A method as claimed in claim 1, wherein the transparent plastic sheet is a sheet of polymethyl methacrylate or polymethylpentene and ArF is used laser gas filler.

3. The method as claimed in claim 1, wherein the transparent plastic sheet is a sheet of polycarbonate, polyethyleneterephthalate or polystyrene and KrF is used as laser gas filler.

4. The method according to claim 1, wherein the channels are arranged in the form of an asymmetrical Y and form an angle of $\beta = 0° - 60°$.

5. The method as claimed in claim 1, wherein the channels are arranged in the form of a symmetrical Y and have a semicircular profile.

* * * * *